(12) United States Patent
Ourabah

(10) Patent No.: US 12,717,054 B2
(45) Date of Patent: Aug. 25, 2026

(54) SEISMIC SENSOR GAIN

(71) Applicant: BP Exploration Operating Company Limited, Middlesex (GB)

(72) Inventor: Amine Ourabah, Guildford (GB)

(73) Assignee: BP Exploration Operating Company Limited (GB)

( * ) Notice: Subject to any disclaimer, the term of this patent is extended or adjusted under 35 U.S.C. 154(b) by 142 days.

(21) Appl. No.: 17/769,076

(22) PCT Filed: Oct. 16, 2020

(86) PCT No.: PCT/GB2020/052617
§ 371 (c)(1),
(2) Date: Apr. 14, 2022

(87) PCT Pub. No.: WO2021/074645
PCT Pub. Date: Apr. 22, 2021

(65) Prior Publication Data

US 2024/0103191 A1 Mar. 28, 2024

(30) Foreign Application Priority Data

Oct. 18, 2019 (GB) ...................................... 1915110

(51) Int. Cl.
*G01V 1/20* (2006.01)
*G01V 1/16* (2006.01)
(Continued)

(52) U.S. Cl.
CPC ................ *G01V 1/20* (2013.01); *G01V 1/168* (2013.01); *G01V 1/245* (2013.01); *G01V 1/307* (2013.01)

(58) Field of Classification Search
None
See application file for complete search history.

(56) References Cited

U.S. PATENT DOCUMENTS 2,939,107 A * 5/1960 Ball ....................... G01V 1/245 330/136
3,525,948 A * 8/1970 Halverson ........... H03G 3/3026 330/110

(Continued)

FOREIGN PATENT DOCUMENTS

DE 102018201168 A1 8/2018
EP 0646809 A1 4/1995

(Continued)

OTHER PUBLICATIONS

International Patent Application No. PCT/GB2020/052617 International Search Report and Written Opinion of the International Searching Authority dated Jan. 20, 2021 (13 pages).

(Continued)

*Primary Examiner* — Jonathan D Armstrong
(74) *Attorney, Agent, or Firm* — Conley Rose, P.C.

(57) ABSTRACT

In some examples, the disclosure provides a method for deploying a plurality N of seismic sensors, wherein each seismic sensor is adapted to measure seismic energy with at least one gain, within a survey area, the method comprising: obtaining a plurality M of gains from which the at least one gain may be selected; configuring the plurality N of seismic sensors such that, for each given gain of the obtained plurality M of gains, at least N/M seismic sensors are adapted to measure the seismic energy with at least one corresponding gain; and deploying the plurality N of configured seismic sensors on the survey area.

14 Claims, 7 Drawing Sheets

Overlapping amplitudes between different Gains, can be used for calibrating sensors amplitudes before HDR
Target dynamic range of the combined HDR seismic trace
Mappable amplitudes
Non-mappable amplitudes
Maximum recordable amplitude ~ Delta A'
Dynamic range D of Sensor 1 with gain G1
Dynamic range D of Sensor 2 with gain G2
Dynamic range D of Sensor 3 with gain G3

(51) Int. Cl.
*G01V 1/24* (2006.01)
*G01V 1/30* (2006.01)

(56) References Cited

U.S. PATENT DOCUMENTS 3,603,972 A * 9/1971 Vanderford ............ G01V 1/245 330/1 R
3,863,200 A 1/1975 Miller
4,152,691 A * 5/1979 Ward ..................... G01V 1/247 341/200
4,187,493 A * 2/1980 Patterson ................. G01V 1/22 367/101
4,280,200 A * 7/1981 Silverman .............. G01V 1/003 166/250.1
4,309,763 A * 1/1982 Passmore ............. G01V 1/3808 367/79
4,658,383 A 4/1987 Zimmer
4,797,668 A * 1/1989 Zimmer ................... G01V 1/48 340/856.4
5,563,847 A 10/1996 Grouffal et al.
5,614,670 A * 3/1997 Nazarian ................. G01M 7/08 73/146
6,075,754 A * 6/2000 VanZandt ............... G01P 15/11 367/182
9,626,981 B2 * 4/2017 Chesney ............... H03M 3/458
9,651,649 B1 * 5/2017 Salloum ................ G01S 3/8083
10,453,465 B2 * 10/2019 Chesney ............... H03M 3/458
10,788,395 B2 9/2020 Franchitti et al.
11,966,252 B2 * 4/2024 Crosby ..................... G06F 1/12
2011/0096624 A1 * 4/2011 Varadarajan ............. G01V 1/16 367/20
2012/0152013 A1 * 6/2012 Wilson ................ E21B 47/0224 73/152.54
2013/0176821 A1 7/2013 Jiang et al.
2014/0174277 A1 * 6/2014 Mann ..................... G10D 99/00 84/331
2014/0307523 A1 * 10/2014 Elder ....................... G01V 1/22 367/25
2015/0380005 A1 * 12/2015 Chesney ................. G10L 25/78 704/500
2017/0194012 A1 * 7/2017 Chesney ............... H03M 3/428
2017/0248720 A1 8/2017 Bernitsas et al.
2018/0231413 A1 * 8/2018 Franchitti .............. G01N 29/42
2021/0355821 A1 * 11/2021 Sun ........................ G01N 29/42
2023/0127346 A1 * 4/2023 Swinburne ............. G01V 1/181 367/55
2023/0161373 A1 * 5/2023 Crosby .................... G01V 1/24 713/500
2023/0194742 A1 * 6/2023 Fernihough ............ G01V 1/245 367/20

FOREIGN PATENT DOCUMENTS

WO 2014165219 A2 10/2014
WO 2017/147575 A1 8/2017
WO WO-2021074628 A1 * 4/2021 ............. G01V 1/302

OTHER PUBLICATIONS

GB Patent Application No. GB1915110.9 Search Report dated Mar. 18, 2020 (3 pages).

Brazilian Office Action dated Oct. 14, 2025, for Brazilian Application No. 1120220074280 (3239-11805) (4 p.).

English Translation of Brazilian Office Action dated Oct. 14, 2025, for Brazilian Application No. 1120220074280 (3239-11805) (4 p.).

* cited by examiner

Obtaining seismic data
S10
200
Combining data
S20

Determining zones
S201
S20
Correcting data
S202

S203
Interpolating data
S20

SEISMIC SENSOR GAIN

CROSS-REFERENCE TO RELATED APPLICATIONS

This application is a National Phase Entry into the U.S. under 35 U.S.C. § 371 of and claims priority to PCT Application No. PCT/GB2020/052617 filed Oct. 16, 2020, entitled "Seismic Sensor Gain," which claims benefit of Great Britain Patent Application No. 1915110.9 filed Oct. 18, 2019, and entitled "Seismic Sensor Gain," the entire contents of each being incorporated herein by reference for all purposes.

STATEMENT REGARDING FEDERALLY SPONSORED RESEARCH OR DEVELOPMENT

Not applicable.

TECHNICAL FIELD

The disclosure relates but is not limited to methods for deploying a plurality of seismic sensors and methods for processing seismic data. The disclosure also relates to corresponding apparatuses, computer programs or computer program products.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy from a source down into the ground and recording the reflected sound energy that returns from the geological layers within the subsurface region.

During a seismic survey, an energy source is placed at various locations on or above the surface region of the Earth, which may include hydrocarbon deposits. Each time the source is activated, the source generates seismic (e.g., sound wave) energy that travels downward through the Earth, is reflected, and, upon its return, is recorded using one or more seismic sensors disposed on or above the subsurface region of the Earth. The seismic data may then be used to create an image or profile of the corresponding subsurface region.

BRIEF SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic sensors may be configured to generate seismic data, e.g. by measuring seismic energy that is generated by a source after propagation in a survey area. The source may be adapted to be displaced at various locations on or above the surface region of the Earth within the survey area.

In cases when the seismic sensor is close to the source, the range of data that the sensor can measure within its dynamic range may be exceeded, and the signal (that corresponds to the seismic energy of the source) may not be recorded in its entirety. In that case, any seismic data that is above a certain range of data is cut away. This phenomenon is called "clipping".

In other cases where the seismic sensor is far from the source, the seismic data may be hard to distinguish from noise.

In both cases, seismic data may be interpreted inaccurately.

Accordingly, present embodiments of the disclosure may enable deploying a plurality of seismic sensors and may process seismic data for accurate interpretation of the seismic data.

Aspects and embodiments of the disclosure are set out in the appended claims. These and other aspects and embodiments are also described herein.

BRIEF DESCRIPTION OF THE DRAWINGS

Embodiments of the present disclosure will now be described, by way of example, with reference to the accompanying drawings, in which.

In the figures, similar elements bear identical numerical references.

DETAILED DESCRIPTION

Figure 1:
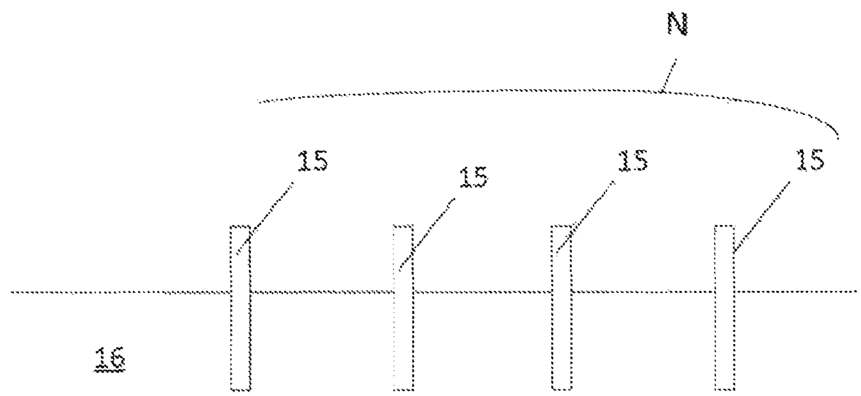
FIG. 1 schematically illustrates a plurality of example seismic sensors disposed in or above a survey area during a seismic survey.

FIG. 1 schematically illustrates a plurality N of example seismic sensors 15 disposed in or above a survey area 16 of the Earth during a seismic survey. The sensors 15 are configured to record the reflected seismic energy that returns from the geological layers within the survey area 16.

Before the seismic survey starts, the sensors 15 may be initialized, e.g. calibrated. After the seismic survey is finished, the seismic data that is recorded by the sensors 15 may be collected and may be used to create an image or profile of the corresponding subsurface region.

In some embodiments, a control system 10 can facilitate the initialization of the sensors 15 and/or the retrieval/collection of the seismic data that has been recorded by the sensors 15.

Figure 2:
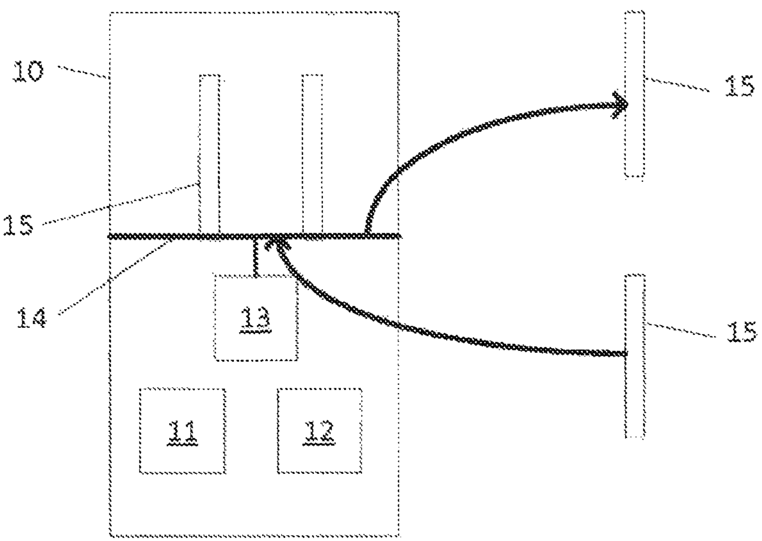
FIG. 2 schematically illustrates an example control system and a plurality of example seismic sensors.

FIG. 2 schematically illustrates an example control system 10 and a plurality of example seismic sensors 15.

The control system 10 comprises a docking station 14 where the plurality of sensors 15 may be removably docked, as illustrated by the arrows of FIG. 2.

The control system 10 also comprises a processor 11, a memory 12 and a communication module 13 that are configured to communicate with a communication module of a sensor 15, e.g. when the sensor 15 is docked in the docking station 14 of the control system 10. The processor 11, the memory 12 and the communication module 13 enable the initialization of the sensors 15 (e.g. calibration) and/or the collection of the seismic data recorded by the sensors 15, e.g. when the sensors are docked in the docking station 14 of the control system 10.

As illustrated in FIG. 2, each sensor 15 may have at least two Gain configurations and 1 Dynamic range D. In a first configuration, the sensor 15 may be docked in a docking station 14 of the control system 10, e.g. for initialization and/or transport to a survey area. In a second configuration, the sensor 15 may be deployed within a survey area for measuring seismic data.

Figure 3:
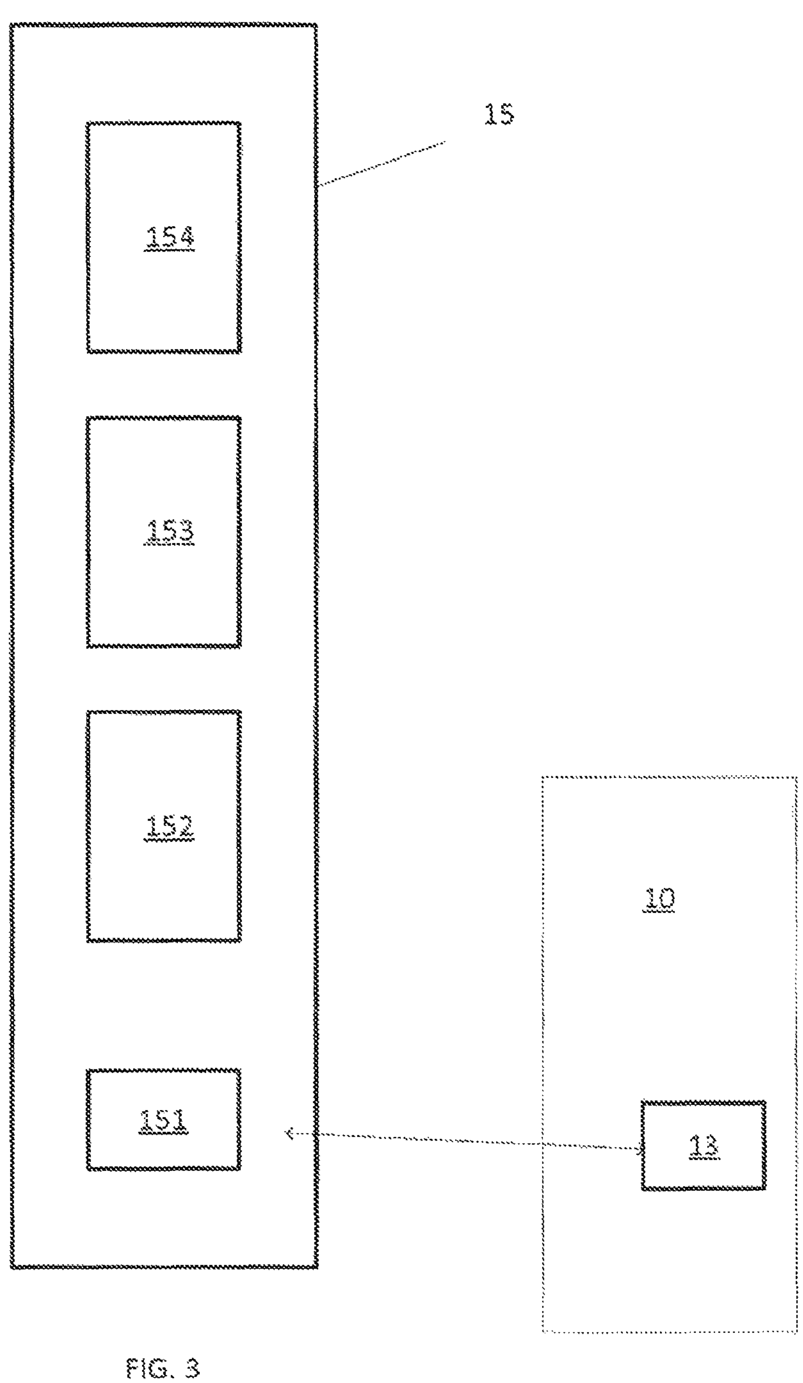
FIG. 3 schematically illustrates an example seismic sensor.

As illustrated in FIG. 3, the sensor 15 comprises a communication module 151 that is configured to communicate with the communication module 13 of the control system 10.

The sensor 15 also comprises a processor 152 and a memory 153. The sensor 15 comprises a measurement module 154 configured to record the seismic (e.g., sound wave) energy travelling in the survey area.

The measurement module 154 may apply one or more amounts of gain Gi to seismic energy, at the time that the seismic energy is being recorded, for example. Each amount of gain of the module 154 represents the ability of the module to increase the power or amplitude of a signal that is to be received by the Analog to Digital Converter (ADC), where the signal reflects the seismic energy that has been sensed by the sensor, and where the sensor is configured to record the seismic data.

Each possible gain Gi of a particular sensor 15 that is to be applied to the seismic energy/signal may be selected from among a plurality M of different possible gains (G1, G2, . . . , GM).

In some examples, each seismic sensor 15 may be adapted to measure the seismic energy with at least one gain (G1 or G2) that has been selected from at least two gains and one dynamic range, such as a lower gain (e.g. applicable for cases when the seismic sensor is close to the source, in order to inhibit clipping in the seismic data) and/or a higher gain (applicable for cases when the seismic sensor is far from the source, in order to generate seismic data that is distinct from noise). Some seismic sensors 15 may be adapted to apply at least one gain Gi which can be selected from at least six possible gains or more (i.e. $M \geq 6$).

In embodiments of the disclosure, a particular group of sensors 15 in the plurality N of sensors 15 may have only one particular gain Gi which is different from that of at least one other group of sensors in the plurality N of sensors.

Because the dynamic range can be hardware dependent, it is generally more convenient to have all sensors working with the same dynamic range D. Other embodiments could cover sensors with different dynamic ranges, but the combination of the signal should take into consideration this new variable.

Alternatively or additionally, each seismic sensor 15 is adapted to measure seismic energy with a plurality p of gains simultaneously, with $0<p\leq M$, with one dynamic range. In such an example, the seismic sensors may be adapted to measure the seismic energy with the plurality p of gains selected from the plurality M of gains $G_i$, and, for each given gain $G_i$ of the plurality M of gains. For example, if the gain may be selected from five gains (i.e. M=5), and the sensor may have three gains (i.e. p=3), each sensor may have a selection of three gains $G_i$ selected from the five possible gains G. In some examples, not all of the sensors have the same combination of gains G. In other examples, all of the sensors may have the same combination of gains $G_i$. In some examples, p may be equal to M, and each sensor comprises all of the M possible gains G (for example all the N sensors may have both a lower gain and a higher gain, simultaneously, for M=2 and p=2).

In some examples, at least N/M seismic sensors may be adapted to measure seismic energy with at least one corresponding gain $G_i$, so that each possible gain $G_i$ in the plurality M of possible gains is deployed during the seismic survey. For example, with N=100 sensors and M=2 gains (i.e. a lower gain and a higher gain are possible) and for p=1 (each sensor may have only one gain at a time) at least 50 sensors have the lower gain and at least 50 sensors have the higher gain. Having an equal distribution of gains in the plurality of sensors enables one or more embodiments to more accurately interpret the seismic data generated by the plurality of sensors.

The plurality N of sensors may be deployed on a survey area for a seismic survey. During a survey, N may be on the order of several thousands of sensors or more. As will be apparent below, when the plurality N of configured seismic sensors are deployed on a survey area according to the disclosure, and/or when the gains of the sensors are selected according to the disclosure, seismic data generated by the plurality of sensors may be interpreted more accurately.

As stated above, the variety M of gains Gi in the deployed N sensors may enable at least some seismic data to be generated, where at least some of the seismic data does not exhibit clipping in the seismic data, and where at least some of the seismic data is distinct from noise, regardless of the location of the source of seismic energy with respect to the plurality N of seismic sensors in the survey area.

In some examples, the plurality M of gains Gi may be determined such that the seismic energy may be recorded by the plurality N of seismic sensors as both distinct from noise and exempt from clipping.

In some examples, when the plurality N of sensors are deployed on the survey area, at least N/M seismic sensors may have a gain Gi selected from the plurality M of possible gains G, and this is applicable for each gain Gi of the plurality M of possible gains. In other words, at least N/M sensors may have a gain G1, at least N/M sensors may have a gain G2, etc., and at least N/M sensors may have a gain GM. Having an equal distribution of gains in the plurality of sensors enables the seismic data generated by the plurality of sensors to be interpreted more accurately.

A group of sensors comprising the same gain Gi can be referred to as a "gain class" or "class." At least one class of N/M seismic sensors is adapted to measure the seismic energy with a corresponding gain Gi. M classes c1, . . . , cM of sensors may be formed (e.g. two classes for M=2 and p=1).

Figure 4A:
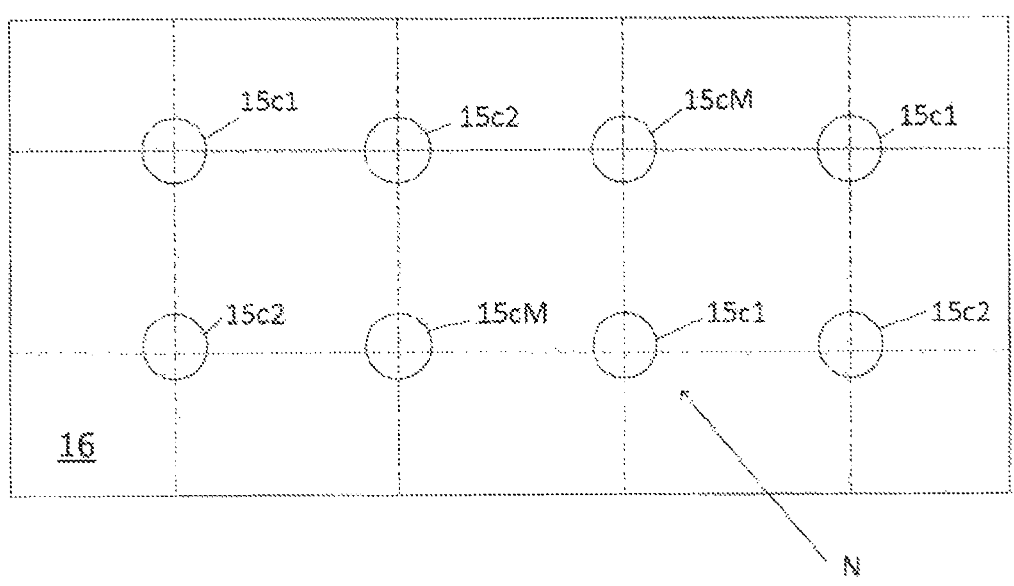
FIGS. 4A and 4B schematically illustrate examples of deployment of the sensors on a survey area.
Figure 4B:
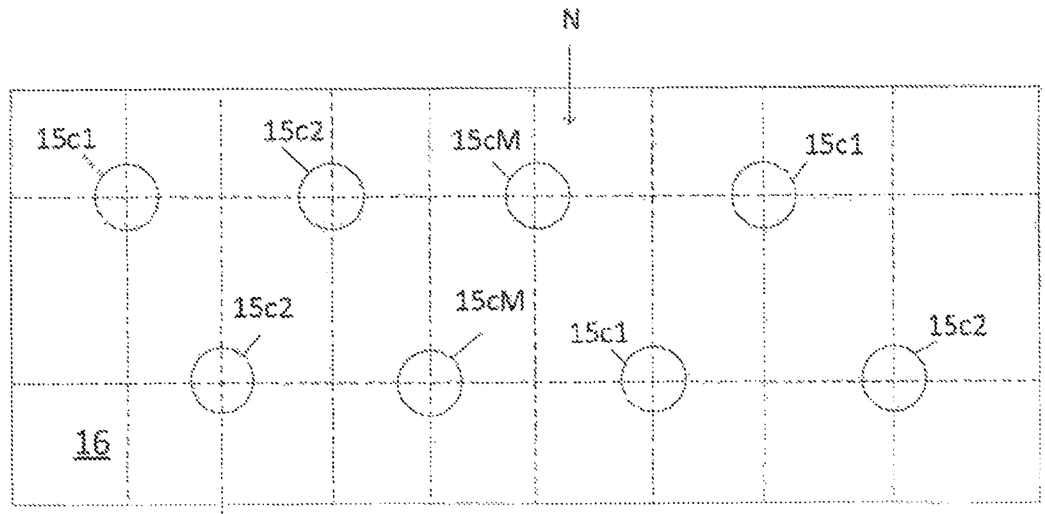

As illustrated in FIGS. 4A and 4B, in some examples, the plurality N of seismic sensors 15 may be deployed, such that each class c1, . . . , cM of sensors 15 may be deployed uniformly over the survey area 16, e.g. the deployment of each class of sensors follows a substantially repetitive, periodic pattern over the survey area 16. Having a uniform distribution of the sensors on the survey area 16 enables the seismic data generated by the plurality of sensors to be interpreted more accurately, due to a uniform distribution of the survey.

In some examples, the deployment may be uniform such that:

- the whole or most of the survey area 16 is covered by the deployed N sensors 15 following a substantially periodic grid; and/or
- the sensors are deployed according to a substantially regular permutation along lines and/or rows of the substantially periodic grid covering the survey area.

As illustrated in FIG. 4A, the uniform deployment over the survey area 16 may be following the substantially regular grid shown by the dotted lines, and a sensor 15*ci* of a class $c_i$ (with 1≤i≤M) occupies an intersection of the grid, in a regular permutation with other sensors 15*cj* (with j≠i) of other classes $c_j$. In other words in FIG. 4A, a sensor 15*c*1, a sensor 15*c*2 and a sensor 15*c*M, etc. are deployed in a permutation in a line.

As illustrated in FIG. 4B, the uniform deployment may be in a staggered grid.

In other words in FIGS. 4A and 4B, a sensor 15*ci* of a class c is deployed next to at least one sensor 15*cj* (with j≠i) of another class cj.

Other deployments are envisaged. In some examples, the deployment may be at random, although it may be over the whole of the survey area.

In an example, clusters ki (1≤i≤N/M) of seismic sensors 15 may be formed and deployed uniformly over the survey area 16. Each cluster ki may comprise at least one seismic sensor 15*ci* of each class ci (with 1≤i≤M) of seismic sensors described above. There may be N/M clusters k, and, for example,

- with M=2 and p=1, each cluster k comprises 2 sensors and the number of clusters is N/2, and
- with M=3 and p=1, each cluster k comprises 3 sensors and the number of clusters is N/3.

Figure 5A:
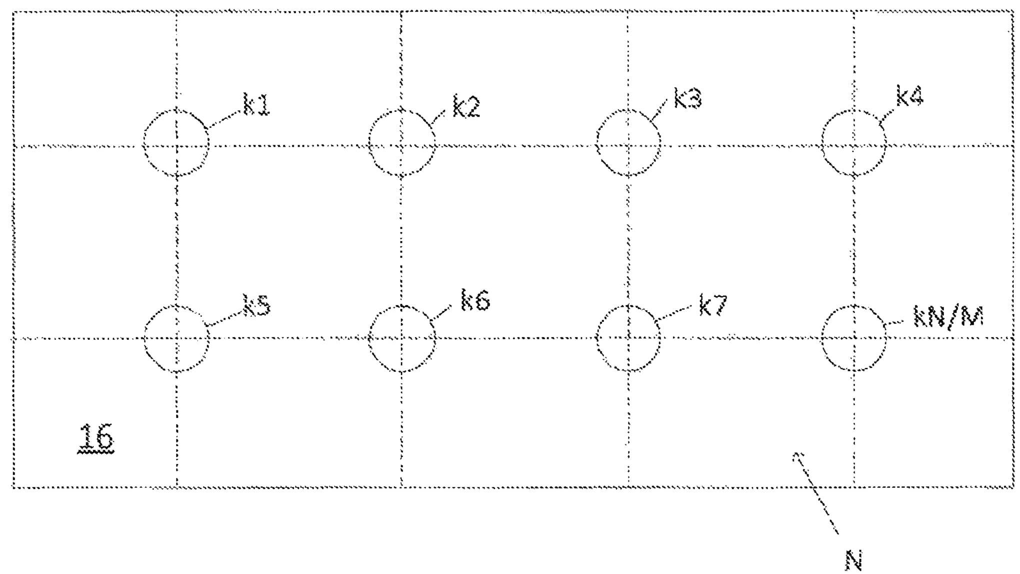
FIGS. 5A and 5B schematically illustrate other examples of deployment of the sensors on a survey area.
Figure 5B:
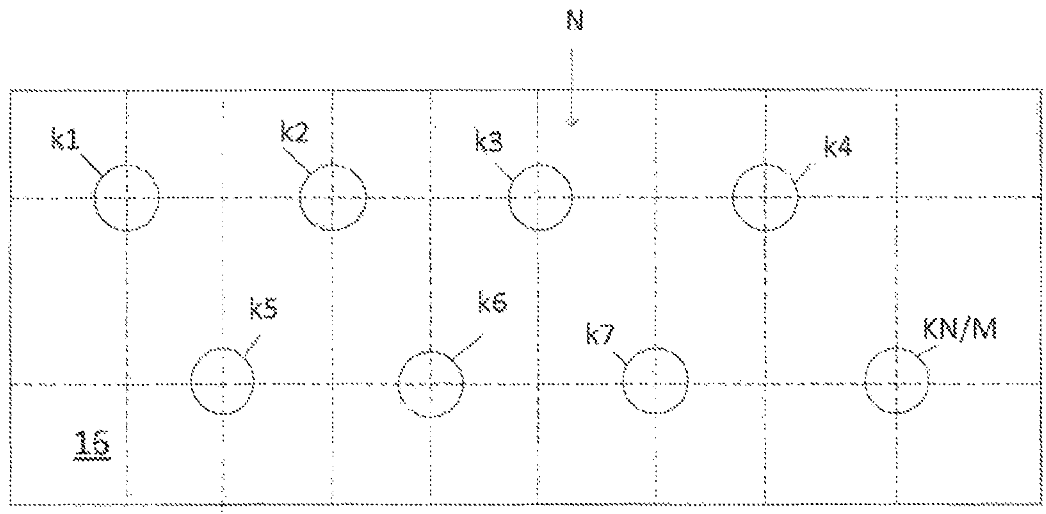

As illustrated in FIGS. 5A and 5B, alternatively or additionally, in some examples, the plurality N of configured seismic sensors 15 may be deployed, such that each cluster k1, . . . , kN/M of sensors 15 may be deployed uniformly over the survey area 16, e.g. the deployment of each cluster of sensors follows a substantially repetitive, periodic pattern over the survey area 16. As already stated, having a uniform distribution of the clusters on the survey area 16 enables the seismic data generated by the plurality of sensors to be interpreted more accurately, due to a uniform distribution of the survey.

In some examples, the deployment may be uniform such that the whole or most of the survey area 16 is covered by the deployed clusters k of sensors 15 following substantially a grid.

As illustrated in FIG. 5A, the uniform deployment may be in a regular grid, a cluster k occupying each intersection of the grid. As illustrated in FIG. 5B, the uniform deployment may be in a staggered grid.

Other deployments are envisaged. In some examples, the deployment of the clusters may be at random over the survey area 16.

As already discussed, each cluster k may be implemented by a single sensor that is configured to record the seismic energy with a plurality of gains simultaneously, such that p>1.

Figure 6:
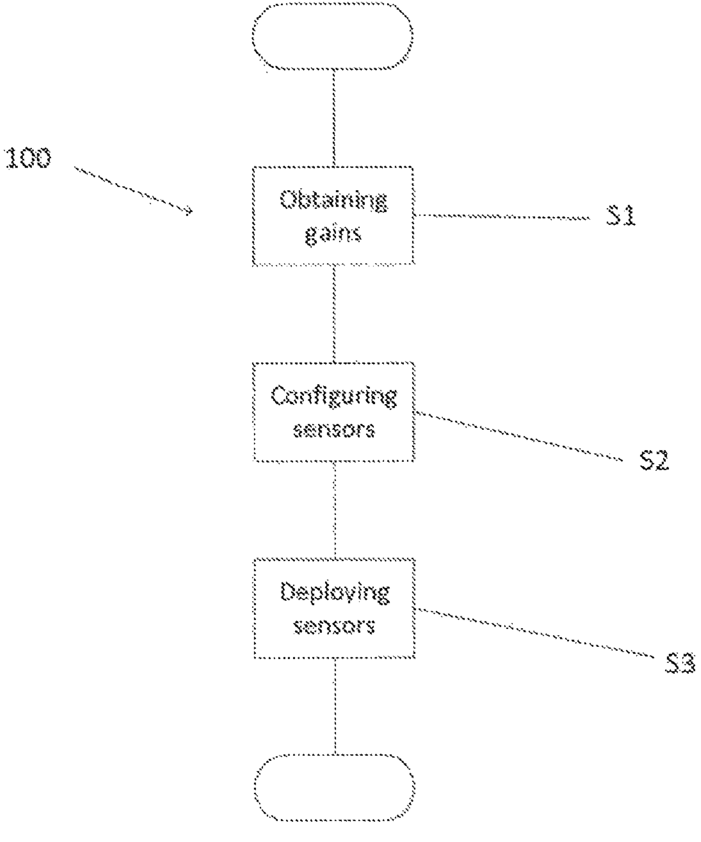
FIG. 6 shows a flow chart which schematically illustrates an example method according to the disclosure.

FIG. 6 shows a flow chart illustrating an example method 100 according to the disclosure. The method 100 of the disclosure may enable deploying a plurality N of seismic sensors. As will be apparent below, the method 100 may comprise configuring the plurality N of seismic sensors by selecting, for each sensor, at least one gain from a plurality M of gains.

The method 100 illustrated in FIG. 6 mainly comprises:

- obtaining, at S1, a plurality M of gains from which at least one gain of each sensor may be selected; and
- configuring, at S2, the plurality N of seismic sensors such that, for each given gain of the obtained plurality M of gains, at least N/M seismic sensors are adapted to measure the seismic energy with at least one corresponding gain $G_i$.

Examples of a plurality M of gains have already been described. In some examples, obtaining at S1 the plurality M of gains comprises determining the plurality M of gains such that the seismic energy may be recorded by the plurality N of seismic sensors, where the recorded seismic energy can appear as both distinct from noise and exempt from clipping, regardless of the position of the source in the survey area. In some examples, each seismic sensor may be adapted to measure the seismic energy with at least one gain G1 or G2 selected from at least two gains, such as a lower gain (e.g. applicable for cases when the seismic sensor is close to the source, in order to inhibit clipping in the seismic data) and/or a higher gain (applicable for cases when the seismic sensor is far from the source, in order to generate seismic data with is distinct from noise).

The configuring at S2 of the plurality of seismic sensors may take place in the control system already discussed with reference to FIG. 2.

The method 100 of FIG. 6 may also comprise deploying, at S3, the plurality N of configured seismic sensors on the survey area.

Non-limiting examples of deployment of the sensors on the survey area have already been discussed, e.g. with reference to FIGS. 4A, 4B, 5A and 5B.

In some examples, the method 100 may be implemented, at least partly, by the system and/or the sensor already described.

Figures 7, 8, 9:
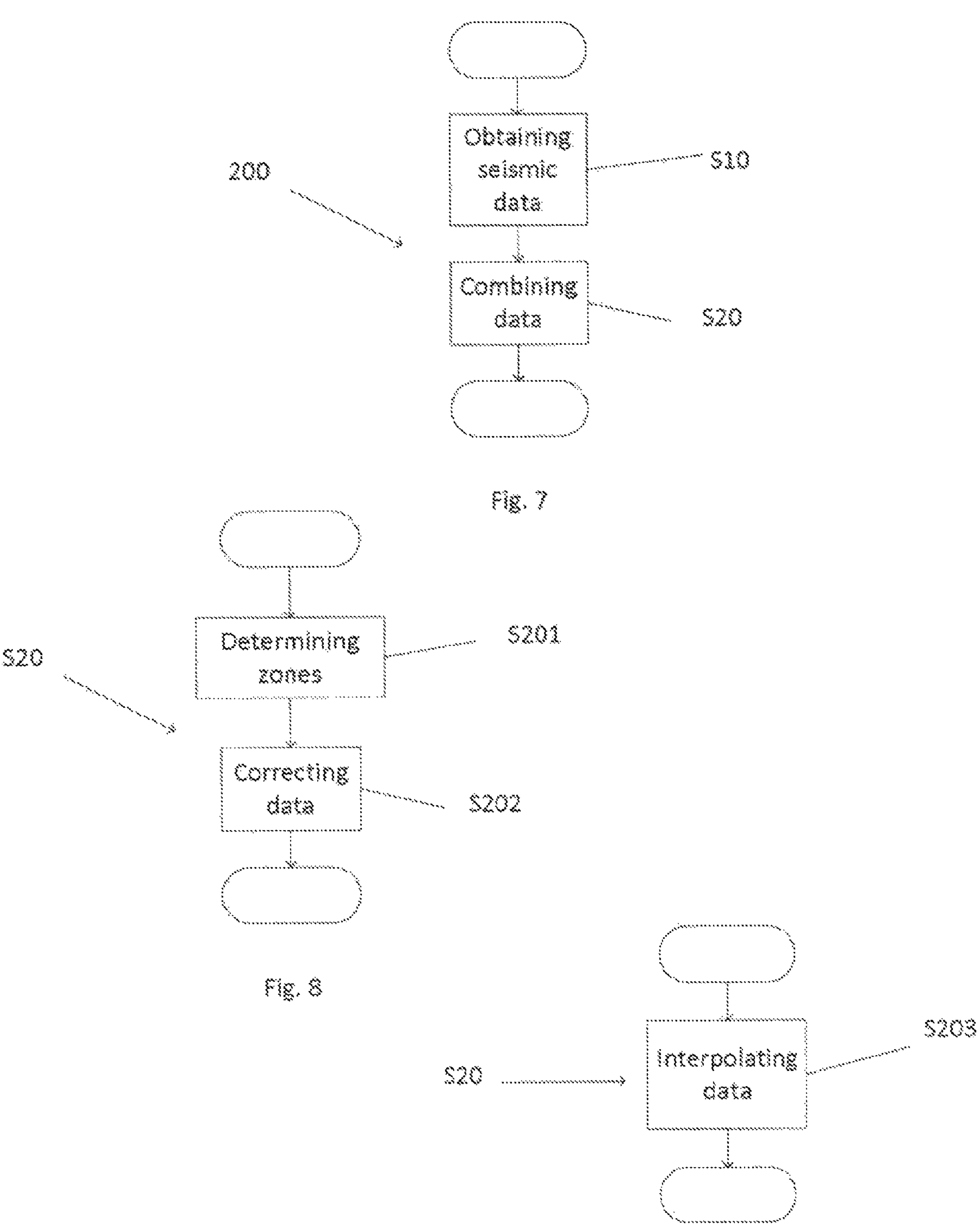
FIG. 7 shows a flow chart which schematically illustrates another example method according to the disclosure.
FIG. 8 shows a flow chart which schematically illustrates detailed steps of the example method of FIG. 7.
FIG. 9 shows a flow chart which schematically illustrates other detailed steps of the example method of FIG. 7.

FIG. 7 shows a flow chart which schematically illustrates another example method 200 according to the disclosure.

FIG. 7 schematically illustrates a method 200 for processing seismic data. In the method 200, the seismic data provided by the plurality N of seismic sensors may be processed by combining the seismic data obtained from the plurality N of seismic sensors. As already described, each seismic sensor may be adapted to measure seismic energy with at least one gain Gi selected from a plurality M of gains. In some examples, at least N/M seismic sensors are adapted to measure the seismic energy with at least one corresponding gain Gi, the plurality N of sensors taken together having all of the values of the plurality M of gains.

The method 200 illustrated in FIG. 7 mainly comprises, for each seismic sensor of a plurality N of seismic sensors deployed within a survey area, obtaining, at S10, seismic data.

The method of FIG. 6 may further comprise combining, at S20, the seismic data obtained from the plurality N of seismic sensors.

Figure 10:
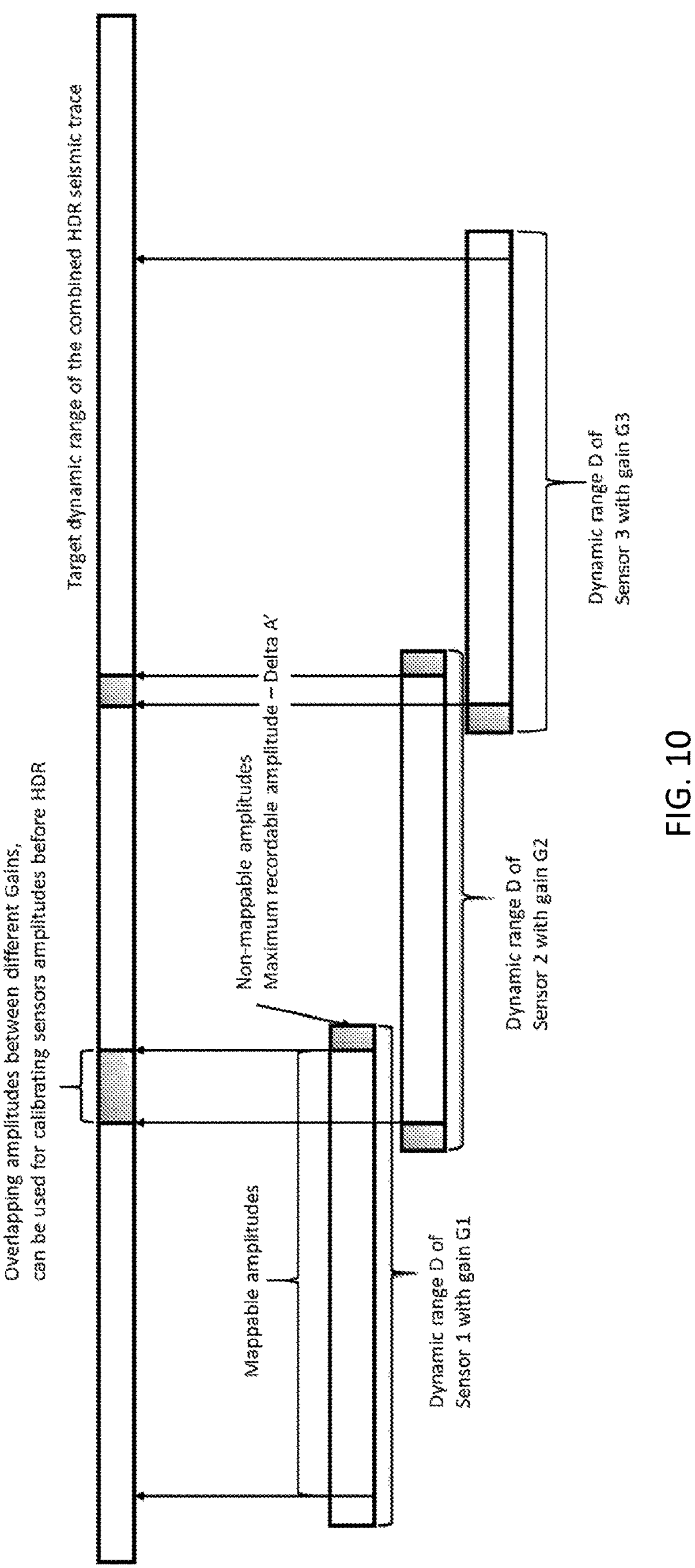
FIG. 10 illustrates a combining of seismic data in accordance with one or more embodiments.

In some examples, combining, at S20, the seismic data may comprise obtaining combined data Sc such that the new signal Sc can have a higher dynamic range D' to be recorded fully. For example, sensors could have a dynamic range of 24 bits while the final high dynamic range (HDR) could be 32 bits or 64 bits. This projection of the signal onto a new dynamic range is referred to as “Mapping” in the photography industry and can require the relative amplitudes of the signal that has been recorded by the different Gains Gi to be honoured. FIG. 10 illustrates combining of seismic data, where a first seismic data has a dynamic range D of sensor 1, a second seismic data has a dynamic range D of sensor 2, and a third seismic data has a dynamic range D of sensor 3. Specifically, sensors 1-3 can form an example cluster, where gain G1 of sensor 1 allows sensor 1 to capture high-amplitude seismic energy, where gain G2 of sensor 2 allows sensor 2 to capture mid-range amplitude seismic energy, and where gain G3 of sensor 3 allows sensor 3 to capture low-amplitude seismic energy. The combined dynamic range of these sensors can be mapped onto a new seismic trace with a larger dynamic range, as illustrated in FIG. 10. The larger dynamic range is wide enough to encompass the three individual dynamic ranges. In general, the ratio of overlapping amplitudes between the different gains (e.g., the overlapping amplitudes between Sensor 1 and Sensor 2) should be predictable. In other words, the ratio of overlapping amplitudes is equal to the ratio of gains. If not, the ratio of overlapping amplitudes is not equal to the ratio of gains, and then a calibration factor may need to be applied.

Referring to the dynamic range D of example sensor 1, seismic energy that is outside of this dynamic range D will tend to be clipped away. If the system of sensors does not properly account for the clipping away of seismic energy, then the system can produce erroneous results. In order to account for the seismic energy that is outside of the range of sensor 1, the system needs to refer to another sensor (such as sensor 2, for example) to receive the seismic energy that is outside of the range of sensor 1. Further, in order to properly account for the clipping that is associated with sensor 1, certain amplitudes that are in proximity of the clipped seismic energy are also considered to be non-mappable amplitudes, as illustrated in FIG. 10. As such, each sensor will have a corresponding range of mappable amplitudes that is a subset of the entire dynamic range D. One or more embodiments can then combine these corresponding ranges of mappable amplitudes. In the example of FIG. 10, the mappable amplitudes of sensor 1, sensor 2, and sensor 3 are combined together. As illustrated in FIG. 10, the range of mappable amplitudes of one sensor can overlap with the range of mappable amplitudes of another sensor. For example, referring to FIG. 10, the dynamic range D of sensor 1 overlaps with dynamic range D of sensor 2, and the dynamic range D of sensor 2 overlaps with dynamic range D of sensor 3. The overlapping amplitudes between the different gains can be used for calibrating the amplitudes of the sensors.

The combined seismic data may be interpreted more accurately, as the combined seismic data that is generated with all the possible gains $G_i$ of the plurality M of gains G.

As illustrated in FIG. 8, alternatively or additionally, combining at S20 may further comprise:

determining, at S201, at least one high-intensity zone and/or at least one low-intensity zone in the combined seismic data; and correcting, at S202, the combined seismic data in the determined high-intensity zone and/or low-intensity zone by applying at least one corresponding corrective gain. One or more embodiments perform correction of clipped data, where only portions of the HDR signal ($S_c$) is used on the specific area where clipping has been identified with one or more edge-detection algorithms on an original signal. An edge-detection algorithm generally refers to a mathematical method that identifies points in data where the data has at least one discontinuity.

As illustrated in FIG. 9, alternatively or additionally, combining at S20 may further comprise interpolating, at S203, the obtained seismic data to obtain, for each seismic sensor, at least one seismic data for each gain of the plurality M of gains. In some examples, interpolating comprises performing at least one of the following:

a weighting interpolation; and/or an edge detection algorithm.

The interpolated combined seismic data may be interpreted more accurately, as the interpolated combined seismic data that is generated with all the gains M of the plurality of gains, even at locations where the sensors are not configured to measure the seismic data with all the possible gains M.

Alternatively or additionally, the method 200 may further comprise at least one of the following:

deploying the plurality N of seismic sensors 15 within the survey area 16; and/or generating the seismic energy within the survey area; and/or measuring the seismic energy with the deployed plurality of N seismic sensors 15 within the survey area 16.

In some examples, in the method 200 the seismic sensors may be deployed according to the method 100 already described.

In some examples, the method 200 may be implemented, at least partly, by the system and/or the sensor already described.

MODIFICATIONS AND VARIATIONS

In some examples, alternatively or additionally the communication module 151 of FIG. 3 may be configured to communicate with the communication module 13 wirelessly.

In some examples, communication between the communication module 13 and the communication module 151 of FIG. 3 may include at least one of the following: configuration data from the system 10 to the sensor 15, e.g. for setting at least one gain of the sensor 15; and/or seismic data from the sensor 15 to the system 10, e.g. during and/or after a seismic survey.

Other data are envisaged.

The seismic energy may be generated by a source (such as a truck and/or explosive charges) adapted to be displaced within the survey area.

The invention claimed is:

1. A method comprising:

selecting a plurality M of gains for measuring seismic energy within a survey area; configuring by a control system a plurality N of seismic sensors communicatively docked to the control system after selecting the plurality M of gains such that at least N/M seismic sensors are adapted to measure seismic energy for each gain of the plurality M of gains, wherein each seismic sensor of the plurality N of seismic sensors is adapted to measure seismic energy with a plurality p of gains simultaneously, wherein $0<p\leq M$, and wherein the plurality p of gains are selected from the plurality M of gains;

communicatively undocking the plurality of N seismic sensors from the control system;

deploying the plurality N of seismic sensors on the survey area after configuring the plurality N of seismic sensors and communicatively undocking the plurality of N seismic sensors from the control system, wherein the dynamic range D of each of the plurality N of seismic sensors is the same; and recording the seismic energy in the survey area at each gain of the plurality M of gains with at least N/M seismic sensors of the plurality N of seismic sensors after deploying the plurality N of seismic sensors and communicatively undocking the plurality of N seismic sensors from the control system.

2. The method of claim 1, further comprising:

defining a plurality of classes, wherein each class of the plurality of classes corresponds to a corresponding gain of the plurality M of gains;

selecting at least N/M seismic sensors of the plurality N of seismic sensors for each class; and configuring the at least N/M seismic sensors of each class to measure the seismic energy with the corresponding gain.

3. The method of claim 2, wherein deploying the plurality N of seismic sensors comprises:

uniformly distributing the plurality of classes of seismic sensors over the survey area.

4. The method of claim 2, wherein deploying the plurality N of seismic sensors comprises:

uniformly distributing the plurality N of seismic sensors such that at least N/M seismic sensors of each class are deployed uniformly over the survey area.

5. The method of claim 1, wherein p=M.

6. The method of claim 1, wherein selecting the plurality M of gains comprises:

selecting the plurality M of gains such that a combined recorded seismic energy across M gains using the plurality N of seismic sensors is both distinct from noise and exempt from clipping.

7. The method of claim 1, wherein each seismic sensor is adapted to measure the seismic energy with at least one gain selected from at least two gains.

8. The method of claim 1, further comprising:

obtaining seismic data from the plurality N of seismic sensors; and combining the seismic data to produce a combined seismic data Sc.

9. The method of claim 8, wherein the plurality N of seismic sensors has a dynamic range D, and wherein Sc has a higher dynamic range than the dynamic range D.

10. The method of claim 8, further comprising:

determining at least one high-intensity zone and/or at least one low-intensity zone in the combined seismic data Sc; and correcting the combined seismic data Sc in the determined high-intensity zone and/or low-intensity zone by applying at least one corresponding corrective gain.

11. The method of claim 8, further comprising:

interpolating the obtained seismic data to obtain, for each seismic sensor, at least one seismic data for each gain of the plurality M of gains.

12. The method of claim 11, wherein interpolating comprises performing at least one of the following:

a weighting interpolation; and/or an edge detection algorithm.

13. Apparatus comprising a processor and a memory, the memory comprising instructions which, when executed by the processor, enable the processor to perform the method of claim 1.

14. A computer program or a computer program product comprising instructions which, when executed by a processor, enable the processor to perform the method of claim 1.

* * * * *